Aug. 15, 1961     F. PAPKE     2,995,971
PHOTOGRAPHIC VIEW-FINDER
Filed Jan. 16, 1958
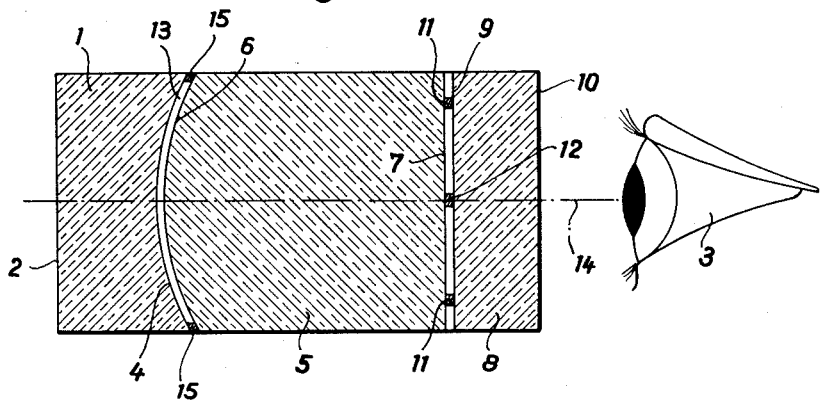
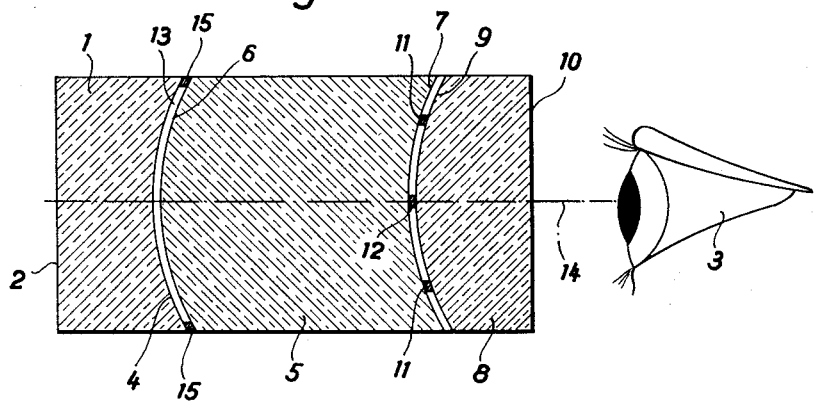
INVENTOR
FRIEDRICH PAPKE
BY
Mocks+Blum
ATTORNEYS

United States Patent Office 2,995,971
Patented Aug. 15, 1961

2,995,971
PHOTOGRAPHIC VIEW-FINDER
Friedrich Papke, Braunschweig, Germany, assignor to Voigtlander A.G., Braunschweig, Germany, a corporation of Germany
Filed Jan. 16, 1958, Ser. No. 709,365
Claims priority, application Germany Jan. 30, 1957
5 Claims. (Cl. 88—1.5)

This invention relates to photographic view-finders and it has particular relation to view-finders in which a frame reflected into the field of the finder indicates the exact image area of the objective associated with the finder.

It has been known that in photographic finders, in which the image is sharply framed according to the principle of the so-called "Albada" finders, into the field of the finder a frame is reflected, which exactly indicates the image area of the objective associated with the finder, this frame being arranged in or around the path of rays of the finder. The operator observes the object to be sighted through a partially permeable spherical concave mirror and the frame, arranged in the focal plane of said mirror, is imaged at about the infinite.

Based on the "Albada" principle, a number of more or less satisfactory finders were developed. However, particular difficulties have been encountered in attaining a satisfactory contrast of the reflected frame, relative to the surrounding portions of the field. Furthermore, the elimination of reflex effects was likewise difficult.

The elimination of undesired reflex effects can be attained, for example, by a block structure of the finder, in which only few glass-air-surfaces are present, because undesired reflex effects occur particularly at such surfaces. Such a block-shaped finder has a front lens carrying a mirror, a light-permeable glass block and, toward the eye, an ocular lens, which latter carries the frame to be reflected, which frame is arranged on a glass plate. The known constructions based on this conception use a frame which is etched in a glass plate and provided with a reflecting or mirror layer. As the imaging mirror, a spherical mirror frame was used, which leaves the finder field clear. In finders of such structure, in practice the reflecting frame causes a division of the pupil is, which renders the use of the finder difficult, insofar as an exactly defined position of the eye is required, in order to actually obtain the desired effect. Generally, no surroundings can be observed by the eye looking through the finder, and the finder segment shows, in most cases, a smaller image angle than the limiting frame. Furthermore, the production of reflecting frames is rather expensive.

The main object of the present invention is the elimination of the above described difficulties.

According to the present invention this elimination is attained by a novel form or design of the mirror which images the frame, applied to a plane glass surface, at substantially infinity. This beam splitting mirror is particularly effective and shows at the same time low losses, or is even practically free from loss.

In carrying out the present invention, in a block-like structure of an Albada-finder, the reflecting surface of the front lens is separated from the reflecting surface of the glass block following the same by a gap of low refractive power, this gap being preferably very narrow.

Thus, the mirror is a two-part structure, and two correspondingly reflecting surfaces are arranged at a small spacing relative to each other. In this manner, it is attained that reflection in the passage at glass-air-surfaces is utilized without substantial interference phenomena. It is thus possible to use these self-reflecting surfaces without additional reflecting layers as the partially permeable mirror of the Albada-finder if the beforementioned air gap is present. The thickness of the air gap should be preferably in the order of magnitude of a few $\mu$. Particularly good effects can be obtained by the use of highly refractive glasses. However, in order to further increase this effect, the glass-air-surfaces can be additionally provided with a highly refractive substance deposited by evaporation. The air gap can be bridged by a cement layer which can be preferably applied at the rim.

In order to further improve the contrast between the finder image and the frame, it is further contemplated, according to the invention, to produce the frame applied to the plane surface turned toward the object, of the rear lens, by deposition of metal by evaporation under vacuum. This procedure results in a considerable reduction of manufacturing expenses in comparison with the production in Albada-finders, having a block shape, of the above mentioned embodiment of the frame by etching. Moreover, a frame applied to the glass surface by vaporization has the advantage that the high reflection of metallic layers applied to polished glass surfaces can be utilized with particularly good effects, whereby the light yield of the mirror system is increased and the contrast between the frame and the image field is improved.

In addition to the frame, an aiming point located at the optical axis can be likewise applied to the frame-carrying surface in order to facilitate the aligning of the camera in picture-taking, if desired.

It is of advantage to reduce reflection, particularly of the viewing surface turned toward the eye, of the finder, in order to avoid undesired reflections. In a manner which is conventional in optical systems, the front surface, turned toward the object, of the finder can be likewise provided with a reflection-reducing layer in order to increase the yield of light.

It has been known from vacuum technique to produce, for various purposes of illumination and reflection, certain layers which are colored or have a color tinge. These methods can be utilized in the present case, for example by having the reflecting frame made of gold, so that it reflects in yellowish-red color and is thus distinguished from the blue color of the sky.

It should be also mentioned that, in the conventional, partially permeable, spherical concave mirror, the refractive power for the rays passing therethrough is normally equal to zero. The conventional form of the frame-carrier is a plane surface which is perpendicular to the optical axis of the finder. This conventional form is essentially satisfactory in some cases, for example in the case of decidedly small image angles; it has the peculiarity, noticeable already at medium image angles, but particularly in the case of larger image angles, that the light which serves for illumination of the frame comes from a direction which is different from the direction of sight, in which the frame reflected in the field of the finder is seen. This is, as a rule, a disadvantage if the frame receives light from a relatively dark zone and its reflected image appears against a relatively bright zone of the finder field. In such a case, the image of the poorly illuminated frame appears pale against the bright background and can be seen poorly or not at all.

According to a preferred embodiment, the frame-carrier has a spherical surface convex in the direction of the object to be observed. The curvature is thereby preferably selected in such a manner that its radius is equal to or smaller than ½ of the radius of the above mentioned partially permeable concave mirror which produces the image of the frame. By using this feature, the light supposed to serve for the illumination of the frame is, in a certain manner, derived from a region at which the operator looks. The resulting effect consists in rendering the image of the frame considerably more distinct, in comparison with a conventional Albada-finder, under unfavorable illumination conditions. The above described spherical curvature can be replaced by a cylindrical curvature, in some cases.

The above mentioned partially permeable hollow mirror, which acts as a beam splitter, is produced (in a manner known by itself) by deposition by evaporation of a reflecting material under high vacuum or by a suitable chemical procedure. The partially permeable metallic layers, obtained according to conventional procedures of the reflection technics, absorb a large portion of the light. On the splitting surface of the hollow mirror, this loss by absorption amounts to even 35% or more. In order to obtain favorable yields of light in the beam splitting, partially permeable mirror provided with partially permeable metallic layers, it is contemplated, according to the present invention, to make the mirror proper of two parts. Thereby, in the direction of light, a plano-concave light-permeable body is followed by an air lens and the latter is joined by a light-permeable plano-convex member. Particularly favorable conditions are thereby obtained if the arched limiting surfaces—which are turned toward each other and enclose the beforementioned air lens—of the two light-permeable bodies or members, have a high refractive power, and have a refractive index for glass of at least $n_d=1.5$. In the use of lenses made of synthetic plastic materials, a refractive index which is higher than $n_d=1.45$ is satisfactory.

A structural finder design, which is particularly advantageous with regard to dimensions and manufacture, is obtained by constructing it of three members, whereby, in the direction of light (a) a front member having a concave limiting surface turned toward the operator's eye, (b) is followed by a glass block having two limiting surfaces curved in the same sense as the concave surface of the front member, and (c) said glass block is, in turn, followed by a rear member having a convex surface adjacent said glass block, and which serves as the carrier for the frame. These three members may be separate parts assembled in a common carrier body, or can be joined in pairs, in particular cases, depending on special requirements. For example, the front member provided with the reflecting mirror can be united with the glass block centrally arranged in the finder, whereby the rear member carrying the frame is self-dependent relative to the two other members. Or, the front member can be arranged by itself and the glass block and the rear member can be combined to a structural unit. Finally, combination of all three members to a closed or compact unit is particularly advantageous. According to a specific embodiment of such a three-member finder, the front lens consists of a plano-concave lens which forms an intermediate air lens with the adjacent glass block, while the plano-convex lens, which forms the rear member, is cemented, at its convex surface carrying the frame, to the glass block. Thereby, the finder is limited by two plane parallel surfaces which have no enlarging optical effect. On the other hand, in this structural form the frame, as well as the partially permeable mirror, are protected from outside effects by an adjacent glass surface. Moreover, cementing of the frame-carrying member to the glass block prevents troublesome reflections. However, such cementing can be dispensed with, if desired. In similar arrangements, the mirror, or the plano-convex lens, the convex surface of which is rendered partially permeably reflecting, can be connected to the glass block. However, by this last-mentioned step the reflection of the mirror is reduced and permeability increased. If the above mentioned particularly advantageous relation, within the meaning of the present invention, was supposed to be restored, the layer deposited by evaporation would have to be made correspondingly thicker, whereby the absorption would be further increased. The above described possibility of inserting an air lens, according to the invention, between the front member and the glass block, serves to eliminate these difficulties. In this connection, it is sufficient to arrange a very small air gap, which needs to have only a thickness sufficient for substantially preventing the occurrence of interference phenomena, e.g. Newton's rings. The two surfaces enclosing the air gap should be preferably parallel. Thus, the air gap renders it possible to fully maintain the originally present reflection of the concave mirror, to which additionally the reflection at the glass-air-surface (which is parallel with the mirror) of the intermediate member of the finder is added, so that the reflection will be increased. From this it follows that, in this embodiment of the invention, at an equal total reflection, the partially permeable metallic layer can be kept thinner. Thus, the optical yield of the finder will be improved.

According to a particularly advantageous embodiment of the invention, both parts, i.e. the concave mirror acting as a beam splitter, as well as the frame, are carried out as reflecting surfaces, which are produced by deposition by vaporizing correspondingly reflecting substances, preferably under high vacuum. This procedure results in obtaining particularly favorable conditions, on the one hand with regard to the partially permeable layer and, on the other hand, with regard to the reflection of the deposited substance.

In producing the frame by deposition from vaporized condition, fundamentally any highly reflecting, non-absorbing metals can be used, which are conventionally employed in the manufacture of mirrors, such as, for example, silver, aluminum and gold. The high reflecting power of these metals can be particularly well utilized in applying them by deposition from vaporized condition to surfaces which are polished according to known optical processes.

A favorable yield of light in the optical sense would be attained in a finder, the partially permeable mirror of which permits 50% of the light to pass and reflects 50% of the light. However, such loss-free beam splitters are normally obtainable by interference layers only and interference layers have mostly the disadvantage of being selective, i.e. they permit to pass a certain part of the spectral range of the light and reflect the other parts. They appear, for example, red by transmitted light and green in reflected light, or yellow by transmitted light and blue in reflected light, etc. Light once passed through them is not reflected again by them or weakly only. Thus, losses in brightness would occur in the reflection of the frame, and the use of a selective interference beam splitter is, therefore, not suitable in the present case. In contrast to this, multiple layers, the effect of which is based on interference, which, however show only a slight tinge in reflection and permeability, yield rather satisfactory results. Therefore, the application of such multiple layers for reflection of the frame, represents a favorable embodiment of the present invention.

On the other hand it is also possible to utilize the normal single-layers for purposes of the present invention rather advantageously.

According to a further embodiment of the invention, both surfaces used, i.e. the concave surface of the first glass member and the convex surface of the second glass member, are rendered reflective with partial permeability. This embodiment offers the possibility of using non-absorbing substances, the reflection of which on one surface by itself does not exceed 30%, as a rule. In order to nevertheless obtain a sufficient contrast of the reflected frame relative to its surroundings, on the second of said surfaces a deposit is produced by vaporization, in the same manner with the same non-absorbing substance. The reflection of these two layers adds up thereby in a manner known by itself and a beam splitter is obtained which shows negligible absorption amounting to a few percent only.

One, or, if desired, both surfaces of the surfaces limiting the air lens are preferably coated according to a further embodiment of the invention with a layer for increasing reflection or with a combination of layers. If both of said surfaces are coated with such additional layers, the additional layer, turned toward the incidence of light, can be of stronger reflection than the other layer.

In order to reduce reflections which would have an adverse or disturbing effect on the use of finders embodying the present invention, it is of advantage to reduce the reflection of the plane surface, turned toward the eye, of the last lens. It is likewise of advantage to provide the plane surface, turned toward the incidence of light, of the front lens with a reflection-reducing layer, for the same purpose.

The frame to be reproduced may consist of a closed line or design, or (in a manner known by itself) of discontinuous lines. In carrying out the invention, it is also possible to arrange—in addition to the frame contemplated for infinite distance—additional cross-pieces or frame parts, which correspond to the parallax compensation at one or more near distances.

In the appended drawings the invention is illustrated in connection with two examples which represent specific embodiments of and best modes for carrying out the invention, in which the structural designs and the dimensions are shown purely diagrammatically, and to which the invention is not limited.

In the drawings,

FIGURE 1 schematically illustrates an Albada-finder in block form, in sectional view along the optical axis, an air gap according to the invention being arranged at the carrier of the partially permeable mirror; and FIGURE 2 is a similar illustration of a finder according to the invention, in which the frame is applied to a spherical surface convex in the direction toward the incidence of light.

Referring now to the drawings in detail, the finder shown in FIG. 1 comprises a plano-concave lens 1, the plane surface 2 of which is turned toward the object. This lens 1 is followed, with the interposition of an air gap 13 and the cement cushions 15, by a member 5, the spherical surface 6 of which, facing the object, has a radius of curvature which largely corresponds to the radius of curvature of spherical surface 4 and is, in the optimum case, smaller by the thickness of the air cushion than the radius of surface 4. On the side toward the eye 3, member 5 has a plane limiting surface 7, which is perpendicular to the optical axis. Frame carrier member 8 has its surface 9 cemented to member 5, and surface 6 carries frame 11 and—in the example shown—a centering mark 12 at the optical axis 14. This mark can be dispensed with, if desired. Surface 10 of member 8, toward the eye, is likewise a plane member and perpendicular to optical axis 14. According to the invention, frame 11, as well as mark 12, are deposited by vaporization on surface 9.

The finder shown in FIG. 2, embodying the present invention, consists of a closed block-shaped unit. Reference numeral 1 denotes the first lens turned to the object to be viewed and this lens has a plane surface 2 on the object side and a spherical surface 4 in the direction of the eye 3. The intermediate glass member 5 has a surface 6, on the object side, which has the same curvature as surface 4 of front lens 1. Reference numeral 13 denotes a gap-shaped narrow air lens located between members 1 and 5. Member 5 has another end surface 7, which is of concave curvature toward the eye 3, and is followed by a lens 8, which is cemented at its surface 9 to member 5, while its outer end surface 10 is plane and parallel to surface 2.

The reflecting frame 11 is deposited on surface 9 of member 8 by vaporizing. In order to indicate the center of the finder image, the center is indicated at 12 by a mark which is preferably likewise produced by vaporizing. Curved surfaces 4 and 6 are spaced from each other by a small distance 13, but adhere to each other, for example due to the use of small cementing cushions 15, or a corresponding cementing ring arranged at the rim. The beam splitting layer can be applied to one of the surfaces 4 and 6, or to both of these surfaces. In the use of highly reflective glasses for special purposes, the application of a particular reflecting layer can be dispensed with, if desired, whereby the glass surfaces exert the function of reflecting.

It has been found to be of advantage to balance the materials of the frame and the beam splitter to each other with regard to their color. It is in this connection that the following combinations yield particularly favorable contrast conditions:

| Beam splitter consisting of— | combined with | Frame consisting of— |
| --- | --- | --- |
| (a) gold—copper alloy. (b) zinc sulfide. (c) antimony sulfide. | | (a) gold or copper. (b) silver or aluminum. (c) gold or copper. |

It will be understood from the above that this invention is not limited to the specific materials, designs, constructions and other details specifically described above and illustrated in the drawings and can be carried out with various modifications without departing from the scope of the invention as defined in the appended claims.

"To deposit by vaporising" means that an element e.g. aluminum, gold, etc. is vaporised under vacuum and that this vapor coats the surface of the lens to be treated as far as it is not covered by templets which keep that zone of the surface uncoated where the corresponding frame has to be applied.

The term "highly refractive glasses" is used in the present application to denote glasses having refractive indices in the range of 1.5–2.0.

As examples of layers used for increasing reflection, tantalum oxide, aluminum oxide, magnesium oxide, niobium oxide are mentioned. Combinations of layers used for this purpose are exemplified by magnesium fluoride+zinc sulphide, lithium fluoride+tantalum oxide, the thickness of the layer of which the quoted combinations consist, is always a quarter of the wave length.

What is claimed is:

1. In a photographic view finder of the "Albada" type in which a partially light permeable spherically concave mirror, through which the object is viewed by an observer, reflects at substantially infinity the image of a picture limiting frame positioned in substantially the focal plane of the mirror: the improvement comprising a first plano-concave lens having a plane surface toward the object and a concave surface which is partially light permeable and partially light reflective; a second plano-concave lens having a convex surface toward the object and carrying a picture limiting frame; an intermediate light permeable concavo-convex block arranged between said first and second lenses and joining the latter into a view finder unit; the convex surface of said block being partially light permeable and partially light reflective and disposed in closely adjacent but slightly spaced relation to the concave surface of said front lens; the concave surface of said front lens and the convex surface of said block being substantially concentric to provide therebetween a substantially spherical and relatively thin air gap of substantially uniform depth; and cement securing together the peripheral margins of the substantially spherical surfaces limiting said air gap; the convex surface of said second lens being substantially concentric with and cemented to the concave surface of said block; the convex surface of said block reflecting light passing through the concave surface of said first lens to such latter concave surface lens for reflection thereby through the convex surface of said block; to augment the light available through said block for imaging of the picture limiting frame.

2. A photographic view finder as claimed in claim 1, in which at least one of the substantially spherical surfaces limiting the air gap is provided with a layer of reflection-increasing substance.

3. A photographic view finder as claimed in claim 2, in which both substantially spherical surfaces limiting the air gap are provided with a reflection-increasing layer and the reflecting layer facing in the direction of the incident light has a greater reflecting power than that of the other of the reflecting layers.

4. A photographic view-finder as claimed in claim 1, in which the substantially spherical surfaces limiting the air gap are provided in equal manner with a partially permeable layer of non-absorbing substances by deposition by vaporizing.

5. A photographic view finder as claimed in claim 1 in which the refractive index of the substantially spherical surfaces limiting the air gap is at least $n_d = 1.45$.

References Cited in the file of this patent

UNITED STATES PATENTS

| | | |
|---|---|---|
| 683,203 | Grub | Sept. 24, 1901 |
| 1,985,067 | Wandersleb | Dec. 18, 1934 |
| 2,392,978 | Dimmick | Jan. 15, 1946 |
| 2,633,051 | Davis | Mar. 31, 1953 |

FOREIGN PATENTS

| | | |
|---|---|---|
| 269,447 | Germany | Jan. 22, 1914 |
| 558,417 | Germany | Sept. 7, 1932 |
| 996,990 | France | Sept. 5, 1951 |
| 1,025,524 | France | Jan. 21, 1953 |